United States Patent Office 3,591,618
Patented July 6, 1971

3,591,618
PROCESS FOR THE PREPARATION OF m- AND p-CYANO BENZYLAMINE AND THE HEXA-HYDRO-DERIVATIVES THEREOF
Ernst Hanschke, Burghausen (Salzach), Germany, assignor to Farbwerke Hoechst Aktiengesellschaft vormals Meister Lucius & Bruning, Frankfurt am Main, Germany
No Drawing. Filed Aug. 29, 1968, Ser. No. 756,326
Claims priority, application Germany, Sept. 29, 1967, F 53,620
Int. Cl. C07c *121/46, 121/52*
U.S. Cl. 260—464     2 Claims

ABSTRACT OF THE DISCLOSURE m- and p-Cyano benzylamine and the hexahydro-derivatives thereof are obtained in excellent yield and purity by catalytic hydrogenation of the corresponding dinitrile in the presence of ammonia and of a (further) solvent when using the amount of hydrogen calculated for one nitrilo group.

The present invention relates to a process for the preparation of m- and p-cyano benzylamine and the hexahydro-derivatives thereof.

It is known that cyano benzylamines can be prepared by chlorinating or brominating cyano toluenes and then reacting the cyano benzyl halides obtained with phthalimide potassium and subsequently splitting or by directly reacting the halogen compounds with ammonia (cf. Ber. 20, 2231 (1887); Ber. 23, 2488 (1890); Ber. 34, 3368 (1901)). Both methods are, however, very complicated and, moreover, the cyano benzyl halides are substances that considerably irritate the skin. It is, furthermore, known that dinitriles can be hydrogenated in the presence of nickel catalysts to yield aminonitriles (cf. Houben-Weyl, 4th edition, vol. 11/1, page 568), hydrogenation being broken off after the amount of hydrogen necessary for one nitrilo group has been consumed. In this process, pure mononitriles are, however, only obtained using dinitriles containing cyano groups linked to groups of different constitution.

Partial hydrogenation of dinitriles containing equivalent nitrilo groups to yield aminonitriles has been carried out hitherto only in the aliphatic series and in moderate yields. This method always provides mixtures of the starting substance, cyano amino and diamine, so that complicated purification methods are required to isolate the desired cyano amines (cf. Houben-Weyl, 4th edition, volume 11/1, page 568). For example, the hydrogenation of adiponitrile according to Swiss Pat. No. 216,288 yields a mixture of unaltered adiponitrile, 1-cyano-5-aminopentane (ω-amino-capronitrile) and 1,6-diaminohexane (hexamethylene diamine). In an analogous manner, a mixture of 2 parts of 1-cyano-methyl-4-aminobenzene and 1 part of 1,4-di-(aminomethyl)-benzene is obtained by the partial hydrogenation of 1,4-bis-(cyanomethyl)-benzene at 60–65° C. According to U.S. Pat. No. 2,208,598, about 50% of aminonitrile and 10 to 15% of diamine are obtained from aliphatic dinitriles, for example adiponitrile, with nickel catalysts and according to U.S. Pat. No. 2,257,814, 50 to 68% of aminonitrile and 30% of diamine are obtained with cobalt catalysts, if 40 to 70% of the hydrogen amount calculated for the hydrogenation yielding diamine, have been consumed.

Considering the above results, it was unexpected that by partial hydrogenation of aromatic dinitriles the corresponding aminonitriles could be obtained in a pure form. Mixtures of the desired aminonitriles with unaltered starting substance and the corresponding diamines have, however, been undesirable since working them up can only be achieved at an uneconomically high expense.

Attempts to hydrogenate aromatic dinitriles in the presence of cobalt catalysts, such as Raney cobalt or cobalt suported on kieselguhr, and of ammonia and solvents at 120° C., only resulted in resin-like condensation products.

Surprisingly, it has now been found that m- and p-cyanobenzylamine and the hexahydro-derivatives thereof can be prepared by a partial hydrogenation of the corresponding dinitriles in the presence of nickel catalysts as well as ammonia and solvents, by hydrogenating the dinitrile in the presence of about 2 parts by weight of ammonia and about 1 to 2 parts by weight of solvent with the approximate amount of hydrogen, calculated for one nitrilo group, at a temperature of from about 100° to about 180° C.

The specified weight ratios are essential features of the present invention. Smaller amounts of solvent and/or ammonia furnish porer yields and impure products.

The solvents used are lower alcohols having 1 to 4 carbon atoms, or dioxane. The simultaneous presence of ammonia considerably reduces the formation of secondary and tertiary amines and, moreover, the ammonia serves as an additional solvent for scarcely solubles dinitriles. Hydrogenation is complete within about 1 hour; after the distillation of the crude product obtained, the aminonitriles are obtained in an almost pure form in yields of from 78 to 92%. The amine numbers are practically in the vicinity of the theoretical value of 75.8 so that a further purification of the aminonitriles is not required. Good results are also obtained using the corresponding hexahydrodinitriles whereas, under the same conditions, a resin-like product is only obtained from o-phthalodinitrile.

The known aminonitriles are intermediates and can be converted by saponification into the corresponding aminocarboxylic acids that may be employed as polyamide monomers.

The following examples serve to illustrate the invention, but they are not intended to limit it thereto.

EXAMPLE 1

A rocking autoclave having a capacity of 5 liters was filled with 300 grams of terephathalic acid dinitrile, 600 milliliters of methanol and 9 grams of Raney nickel. After washing with nitrogen, 900 milliliters of liquid ammonia were added and the autoclave was then pressurized with hydrogen to 65 atmospheres gage. The mixture was heated to 120° C. and hydrogenated for 1 hour at this temperature. After cooling the pressure in the autoclave was about 10 atmospheres gage. After the work-up by distillation there were obtained 78 to 84% of p-cyano benzylamine (calculated on dinitrile used) that boiled at 108-110° C. under a pressure of 0.1 mm. Hg and had an amine number of from 75.6 to 76.0 (calc. 75.8).

When, however, the amount of ammonia was reduced to 600 milliliters, 55.1% of distillate having an amine number of 96, and 44.9% of residue were obtained under the same conditions.

Alternately, when the amount of methanol was reduced to 100 milliliters and the autoclave was pressurized to 50 atmospheres gage with regard to the larger gas volume, a mixture of 5.5% of dinitrile, 57.5% of cyano-amine and 37.0% of residue was obtained.

EXAMPLE 2

In the presence of 10% by weight of a catalyst containing 30% of nickel supported on calcium phosphate, 300 grams of terephathalic acid dinitrile were hydrogenated in the same manner as disclosed in Example 1 and 81% by weight of the theoretical yield of p-cyano-benzyl-amine having an amine number of 76.1 were obtained.

EXAMPLE 3

300 grams of a dinitrile mixture prepared by "ammon-oxidation" of m-xylene having a content of 28% of p-xylene, were hydrogenated under the same conditions as disclosed in Example 1. 91.8% of a mixture of cyano benzylamines having an amine number of 72 were obtained.

EXAMPLE 4

In an autoclave having a capacity of 5 liters, 300 grams of hexahydro-terephthalic acid dinitrile (mixture of the cis- and trans-form) were hydrogenated while adding 600 milliliters of dioxane, 900 milliliters of liquid ammonia and 15 grams of Raney nickel as well as pressurizing with hydrogen to 65 atmospheres gage and then heating for 1 hour at 160° C. There were obtained 285 grams of distillate having a boiling range of from 128 to 151° C. under a pressure of 12 mm. Hg, and an amine number of 73.6 (calc. 72.5). The yield amounted to 90% of the theoretical yield, calculated on dinitrile used.

I claim:
1. In a process for the preparation of m- and p-cyano benzylamine and the hexahydro-derivatives thereof by partial hydrogenation of the corresponding dinitrile with nickey catalysts in the presence of ammonia and a solvent, the improvement which comprises hydrogenating one part by weight of the dinitrile, in the presence of about 2 parts by weight of ammonia and of about 1 to 2 parts by weight of an organic solvent selected from the group consisting of an alcohol of 1 to 4 carbon atoms or dioxane, with the approximate amount of hydrogen, calculated for one nitrilo group, at a temperature of about 100 to about 180° C.

2. The process as claimed in claim 1, wherein the hydrogenation is effected at about 120 to about 160° C.

References Cited

UNITED STATES PATENTS 3,050,544  8/1962  Pietrusza et al. _____ 260—465
3,377,374  4/1968  Hale, Jr. et al. _____ 260—464

OTHER REFERENCES

Freidlin et al.: C. A., vol. 51 (1957), p. 13807.
Scheglov et al.: C. A., vol. 59 (1963), p. 2700.

JOSEPH P. BRUST, Primary Examiner

U.S. Cl. X.R.

260—465, 465.5